US007035958B2

(12) United States Patent
Augsburg et al.

(10) Patent No.: US 7,035,958 B2
(45) Date of Patent: Apr. 25, 2006

(54) RE-ORDERING A FIRST REQUEST WITHIN A FIFO REQUEST QUEUE TO A DIFFERENT QUEUE POSITION WHEN THE FIRST REQUEST RECEIVES A RETRY RESPONSE FROM THE TARGET

(75) Inventors: Victor Roberts Augsburg, Cary, NC (US); James Norris Dieffenderfer, Apex, NC (US); Bernard Charles Drerup, Austin, TX (US); Richard Gerard Hofmann, Apex, NC (US); Thomas Andrew Sartorius, Raleigh, NC (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 10/264,170

(22) Filed: Oct. 3, 2002

(65) Prior Publication Data

US 2004/0068603 A1    Apr. 8, 2004

(51) Int. Cl.
*G06F 13/36* (2006.01)
(52) U.S. Cl. ............... 710/310; 710/309; 710/112; 710/39
(58) Field of Classification Search ........ 710/305–311, 710/313–315, 107–125, 52–57, 33–39; 711/133–146
See application file for complete search history.

(56) References Cited

U.S. PATENT DOCUMENTS 5,761,516 A * 6/1998 Rostoker et al. ............ 710/260
5,838,603 A * 11/1998 Mori et al. .................. 365/63
5,996,036 A * 11/1999 Kelly ......................... 710/110
6,201,529 B1   3/2001 Shimizu ..................... 345/150
6,205,506 B1 * 3/2001 Richardson ................. 710/310
6,237,067 B1 * 5/2001 Eberhard et al. ........... 711/151

(Continued)

OTHER PUBLICATIONS

Patent Abstracts of Japan, Shibayama Hiroaki: "Portable Terminal And Display Method Therefor" Publication No. 2000356977, Feb. 26, 2000, Application No. 11170407, Jun. 17, 1999.

(Continued)

*Primary Examiner*—Rehana Perveen
*Assistant Examiner*—Raymond N Phan
(74) *Attorney, Agent, or Firm*—Robert M. Carwell; Dillon & Yudell LLP

(57) ABSTRACT

A method of operating a request FIFO of a system on a chip (SoC) in which a requests in a first position that has been granted and which subsequently receives a retry from the intended target is automatically re-ordered with respect to the other requests below it in the request FIFO. Each issued requests is tagged to either enable or disable a re-order feature. When a request that is tagged as re-order enabled is granted, the FIFO logic monitors the response provided for the request. If the response is a retry, the request is removed from the first position of the request FIFO and the next sequential request is moved into the first position. The removed requests may be re-ordered within the request FIFO or sent back to the initiator. In the former implementation, controller logic reorders the first request within the request FIFO. In the latter implementation, the controller logic of the bus controller messages the initiator when a request has been retried and subsequently removed from the first position of the request FIFO. The initiator then determines whether or not to re-issue the request.

21 Claims, 7 Drawing Sheets

U.S. PATENT DOCUMENTS

| | | | |
|---|---|---|---|
| 6,633,936 B1 * | 10/2003 | Keller et al. | 710/107 |
| 6,694,397 B1 * | 2/2004 | Lackey et al. | 710/112 |
| 6,763,415 B1 * | 7/2004 | Tischler | 710/240 |
| 6,901,580 B1 * | 5/2005 | Iwanojko et al. | 717/121 |
| 6,907,502 B1 * | 6/2005 | Augsburg et al. | 711/146 |
| 2002/0078282 A1 * | 6/2002 | Drerup et al. | 710/107 |
| 2004/0017820 A1 * | 1/2004 | Garinger et al. | 370/419 |

OTHER PUBLICATIONS

Patent Abstracts of Japan, Tenkai Mayumi: "Image Decoding Device And Method Therefor" Publication No. 10032817, Mar. 2, 1998, Application No. 08183809, Dec. 7, 1996.

* cited by examiner

RE-ORDERING A FIRST REQUEST WITHIN A FIFO REQUEST QUEUE TO A DIFFERENT QUEUE POSITION WHEN THE FIRST REQUEST RECEIVES A RETRY RESPONSE FROM THE TARGET

CROSS REFERENCE TO RELATED APPLICATION

The present application shares specification text and figures with the following co-pending application, which was filled concurrently with the present application: application Ser. No. 10/264,169 titled "Method for Moving Snoop Pushes to the Front of a Request Queue."

BACKGROUND OF THE INVENTION

1. Technical Field

The present invention relates generally to computer systems and in particular to a computer system designed as a system on a chip (SoC). Still more particularly, the present invention relates to a method and system for manipulating the issuance of requests from a request FIFO of a SoC when a prior request is retried.

2. Description of the Related Art

The computer industry has made significant developments in integrated circuit (IC) technology in recent years. For example, ASIC (application specific integrated circuit) technology has evolved from a chip-set philosophy to an embedded core based system-on-a-chip (SoC) concept. The system-on-a-chip concept refers to a system in which, ideally, all the necessary integrated circuits are fabricated on a single die or substrate. An SoC IC includes various reusable functional blocks, such as microprocessors, interfaces (e.g., external bus interface), memory arrays, and DSPs (digital signal processors). Such pre-designed functional blocks are commonly called "cores".

With a SoC, processed requests are sent from a core referred to as an initiator to a target (which may also be a core). An initiator (or master or busmaster as it is sometimes called) is any device capable of generating a request and placing that request on the bus to be transmitted to a target. Thus, for example, either a processor or DMA controller may be an initiator.

Some initiators, called "caching-initiators", internally cache copies of the contents stored in the targets. A caching-initiator includes a cache for holding duplicate contents of a target (memory), a request-port for initiating requests and a snoop-port for snooping the contents of the cache when other initiators access the targets.

Targets (or slaves) are the receiving component that receives the initiator-issued requests and responds according to set protocols. A request is sometimes broadcasted to multiple targets, but based on some of the attributes of the request (such as the address), only one target "claims" the request and responds.

In order to complete the connections between initiators and targets, the SoC includes an on-chip bus utilized to connect multiple initiators and targets. The system bus consists of an interface to the caching-initiators and a separate interface to the targets and logic between the interfaces. The logic between the interfaces is called a "bus controller". This configuration is typical among system-on-a-chip (SoC) buses, where all the initiators, targets and the bus controller are on the same chip (die). In current systems, this bus is referred to as processor local bus (PLB) and has associated logic, PLB Macro. The "PLB Macro" is a block of logic that acts as the bus controller, interconnecting all the devices (i.e., initiators and targets) of the SoC.

A key component of PLB macro utilized to order requests being sent from an initiator to various targets is the request FIFO. Each request sent from the initiator is placed in the request FIFO and then the oldest request in the request FIFO is issued to the arbiter. The arbiter receives a request from each request FIFO and directs the requests to their respective targets.

The Bus Controller consists of a "request queue", an arbiter, routing logic and miscellaneous buffering and registering logic. The "request queue" is a FIFO that holds a multitude of pending requests from an initiator. Requests are pipelined by the initiators into the "request queue" of the bus controller. This means that a new request is sent by the initiator before any response is received for previous sent requests. The FIFO structure of the request queue (hereinafter referred to as request FIFO) ensures that the transaction ordering intended by the initiator is maintained. This order is simply indicated by the order in which the initiator queues its requests. There is one request FIFO for each initiator. Each request FIFO sends its output (the oldest request) to the arbiter. The arbiter selects which request is "granted" from among the pending requests from each of the request FIFOs. When a request is "granted", it is broadcast to the snoopers and the targets. The routing logic directs the appropriate signals to/from the initiator associated with the granted request and the appropriate target.

Targets typically acknowledge a request when the request is received, however, if the target is busy for some reason, the target may instead signal "retry" indicating that the current request should be resent. Because of the FIFO structure of the request queue, when a request is granted, but then subsequently retried by the target, the request remains on the "output" of the FIFO. The request is later repeated when the arbiter grants it again, without requiring any activity from the initiator. Notably, with this method of scheduling requests from a FIFO, the next request in the FIFO is forced to wait until the previously granted request is accepted by its target. There is, therefore, a built-in uncertainty regarding when a request within the request FIFO is actually granted. A request may be forced to wait a number of clock cycles while the previously granted request is retried a number of times.

Significant performance degradation exists with current systems for several reasons. For example, the next request may go to a different target that is not busy. Also, the next request has no dependency on the granted request and thus there is not reason why the next request should have to wait until completion of the granted request. Additionally, because there is no guarantee that the target will accept the granted request within a reasonable time period (i.e., the target may be in a busy state for an indefinite period of time), forcing the next request to wait on completion of the granted request may result in a deadlock within the system.

The present invention recognizes that it would be desirable to be able to move forward through the request FIFO, particularly when subsequent requests are not dependent on the prior granted request, which has been retried. A method and system that enables dynamic re-ordering of a granted request relative to subsequent requests within the request FIFO when the granted request is retried would be a welcome improvement. These and other benefits are provided herein.

SUMMARY OF THE INVENTION

Disclosed is a method of operating a request FIFO of a system on a chip (SoC) in which a requests in a first position that has been granted and which subsequently receives a retry from the intended target is automatically re-ordered with respect to the other requests below it in the request FIFO. Each issued requests is tagged to either enable or disable a re-order feature. When a request that is tagged as re-order enabled is granted, the FIFO logic monitors the response provided for the request. If the response is a retry, the request is removed from the first position and the next sequential request is moved into the first position. Thus, the next sequential request may be completed prior to the first request.

To determine which ones of the requests should be tagged re-order enabled, the initiator determines which requests do not have any downstream dependency for subsequent requests being issued. Those requests with no dependencies are tagged to indicate to the request FIFO logic that a next sequential request should be granted whenever a prior request is retried. Notably, any request that is not tagged must be completed prior to the next sequential request being granted for completion.

The removed requests may be re-ordered within the request FIFO or sent back to the initiator. In the former implementation, controller logic reorders the first request within the request FIFO. In the latter implementation, the controller logic of the bus controller messages the initiator when a request has been retried and subsequently removed from the first position of the request FIFO. The initiator then determines whether or not to re-issue the request.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention provides a novel method and system for granting requests from a FIFO of a SoC bus controller while there is a previously granted requests that has not completed. According to the illustrative embodiment, when the previously granted requests are retried by the target, the request is removed from the top of a request FIFO and the next request within the queue is granted. The ability to remove a retried request from the top of the FIFO is controlled by the initiator, which tags specific ones of the issued requests to allow those requests to be re-ordered whenever they are retried by their respective targets.

The invention is implemented in computer systems that consist of at least one initiator and target/slave devices that transfer data between each other via a system bus. The system bus consists of an interface to the initiator(s) and a separate interface to the targets. The bus also consists of logic between the interfaces called a "bus controller" or PLB macro.

Figure 1:
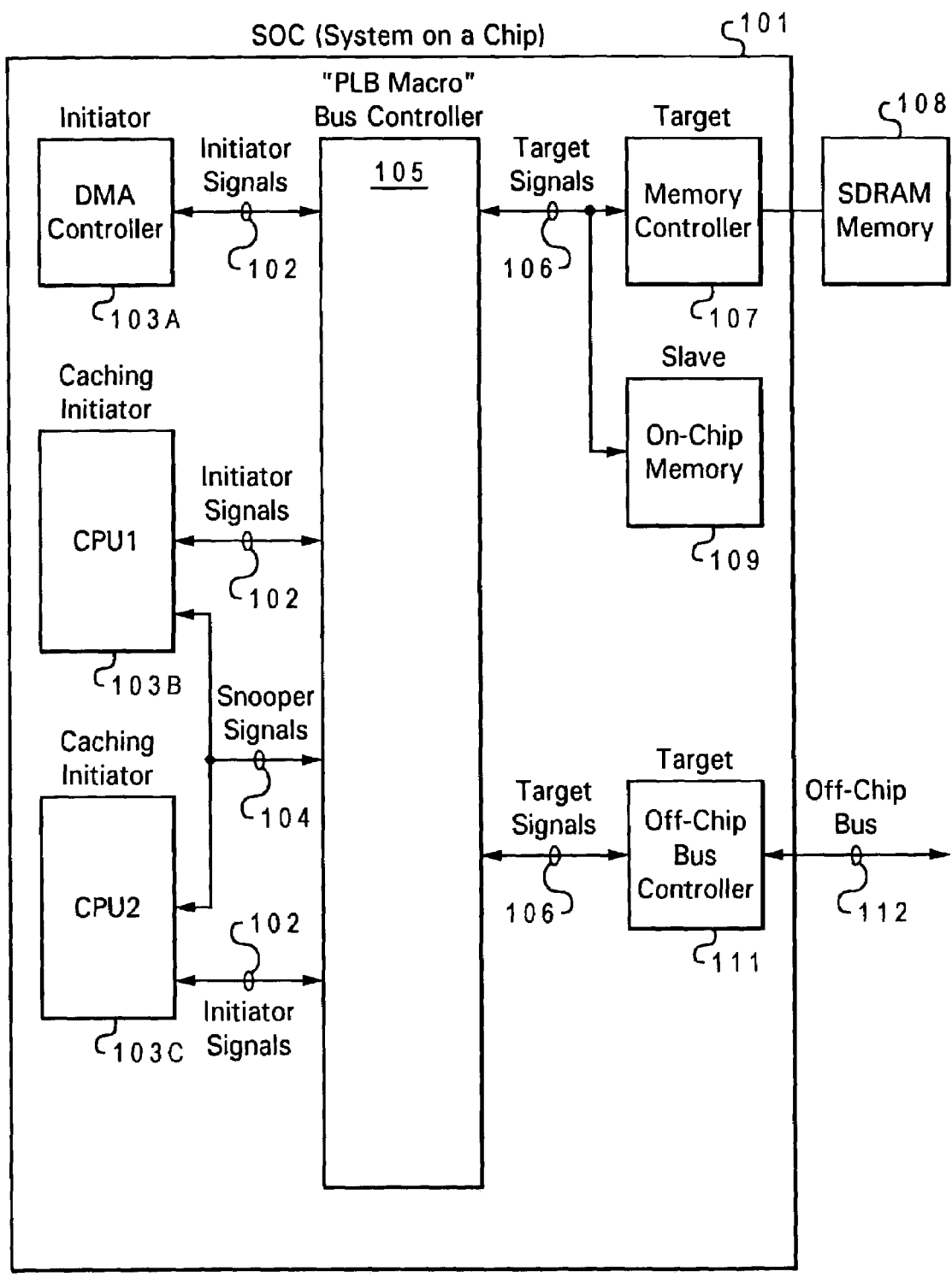
FIG. 1 is a block diagram illustrating major components of a system on a chip (SoC) within which the features of the present invention may advantageously be implemented.

In the illustrative embodiment, the computer system is a system-on-a-chip (SoC) having a PLB5 bus and PLB5 macro. FIG. 1 illustrates a SoC in which the features of the invention may be implemented. SoC 101 comprises several initiators, targets and the bus controller, all fabricated on the same chip (die).

As shown initiators include direct memory access (DMA) controller 103A and two embedded processor cores CPU1 103B and CPU2 103C. Generated initiator signals 102 are sent to processor local bus (PLB) controller (PLB Macro) 105, which arbitrates and sends target signals 106 to their respective destination target. As shown, the destination targets is one of a memory controller (target) 107, which is coupled to and controls access to off-chip (i.e., external to SoC) memory, such as SDRAM 108 (synchronous dynamic random access memory), an on-chip memory (slave) 109, or an off-chip bus controller (target) 111. The latter target 111 has an associated off chip bus 112 by which it connects to off-chip components.

Figure 2:
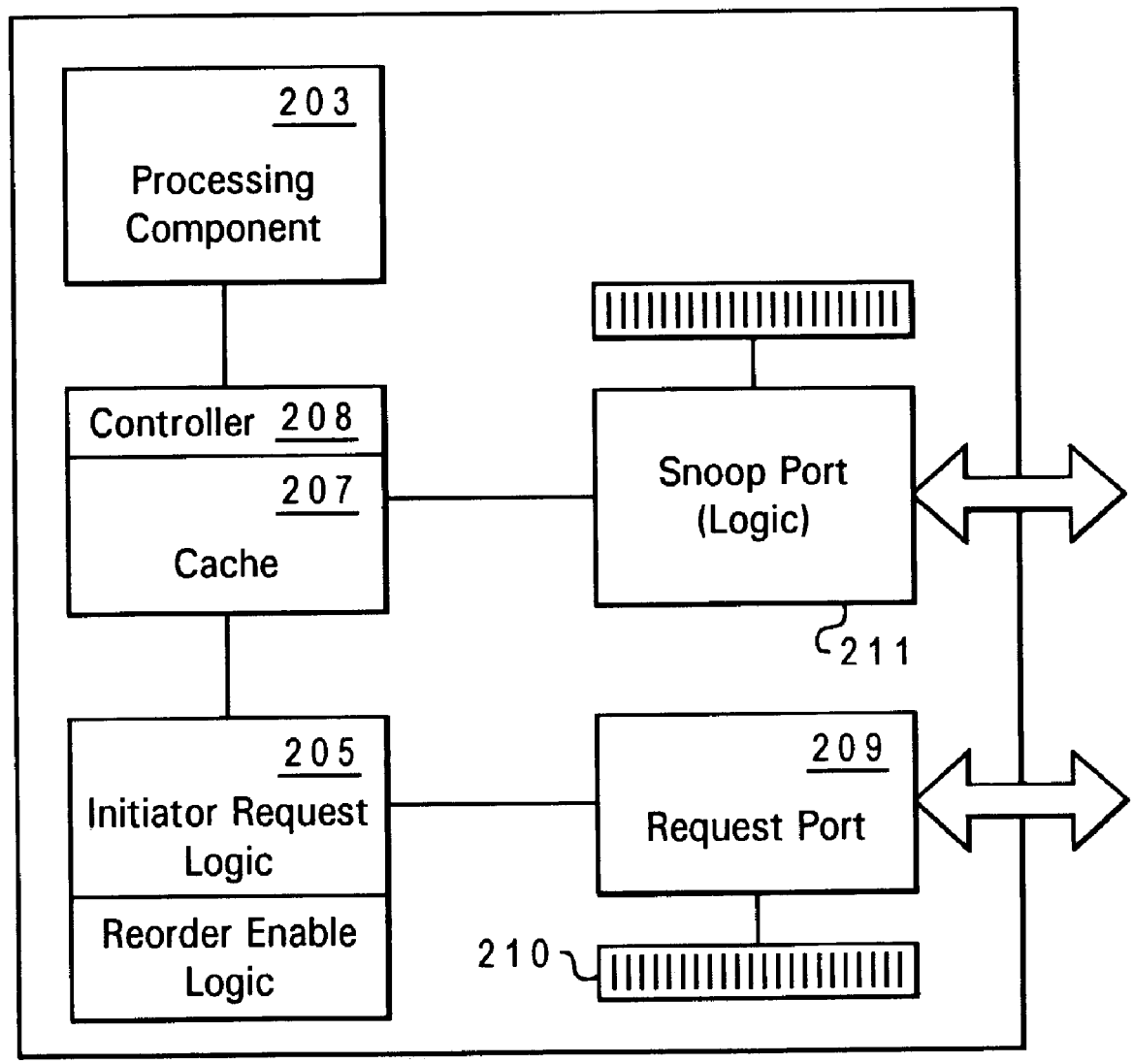
FIG. 2 is a block diagram representation of an initiator with logic for implementing the features of the present invention.

FIG. 2 illustrates an initiator designed according to the present invention. Initiator 201 includes a processing module 203 (although initiator 201 may in itself be a CPU) and initiator request logic 205. Initiator request logic 205 may be a sub-component of processing module 203, although illustrated as a separate component herein. Initiator request logic 205 comprises reorder enable logic by which various operations of the present invention are controlled and implemented.

Finally, initiator 201 includes a request-port for initiating/issuing requests to PLB5 macro via PLB bus, an associated request register 210 for tracking requests issued from initiator 201, and a snoop-port 211 for snooping snoop requests issued by other initiators on the bus.

Figure 3:
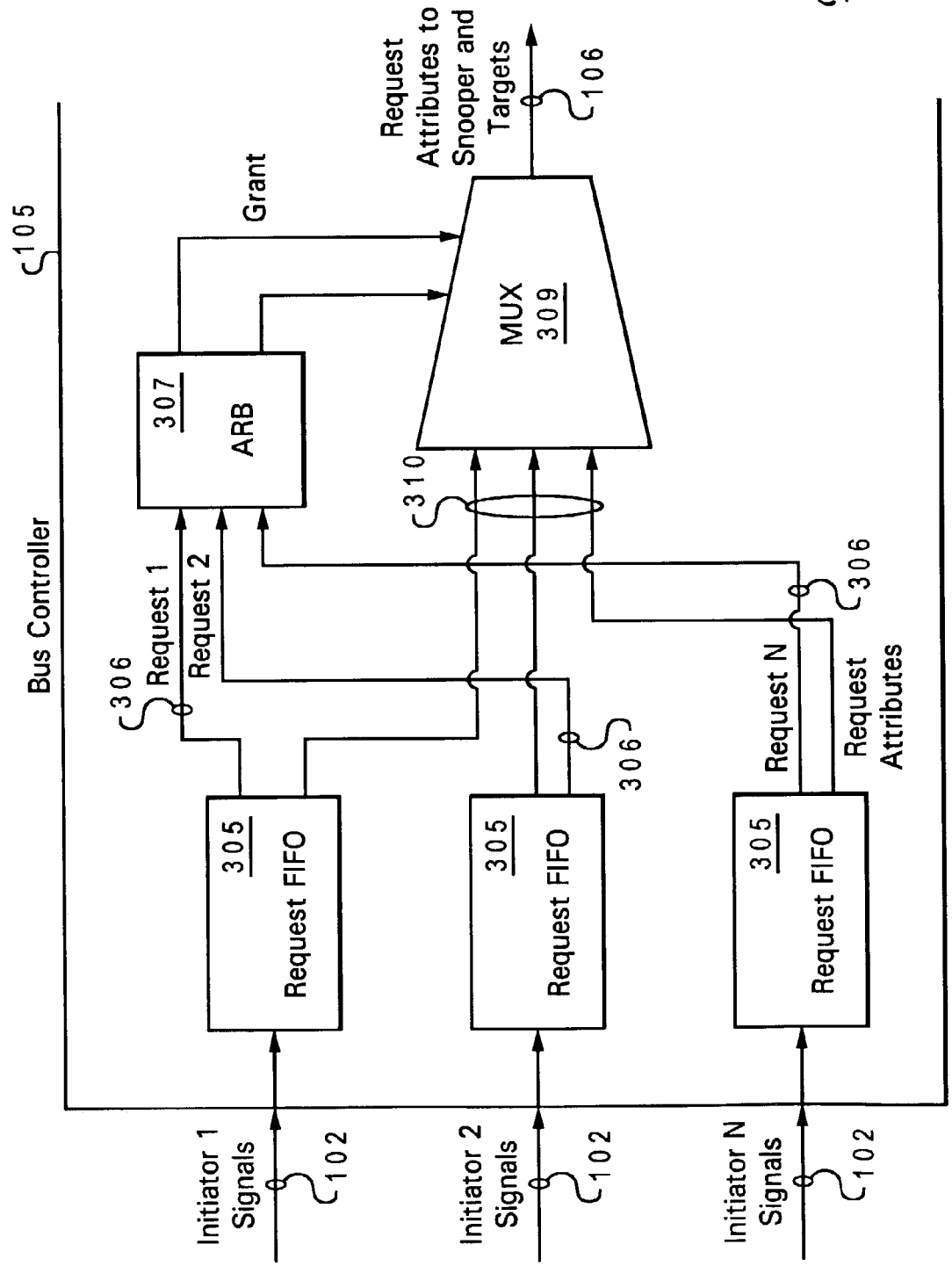
FIG. 3 is a block diagram of a bus controller of the SoC of FIG. 1, which controller handles the request grants, re-ordering and other features according to one implementation of the invention.

FIG. 3 illustrates a bus controller, within which several key processes/features of the invention are implemented. Bus controller 105 consists of multiple First-In-First-Out (FIFO) request queues 305, which each receive a corresponding set of initiator input signals 102. There is one request queue for each initiator. Request queues 305 consist of several sequential registers/blocks (not shown) that each temporarily stores a request received from the corresponding initiator. The request remains within the request queue 305 until all requests ahead of it in the request FIFO are granted. Requests are pipelined by the initiators into the respective request queues. This means that a new request is sent by the initiator before any response is received for previously sent requests. The FIFO structure of the request queue ensures that the transaction ordering intended by the initiator is maintained. This order is simply indicated by the order in which the initiator queues its requests. Request queue issues requests 306 to arbiter 307 in the order the requests were received from the initiator, which is also the order of placement within the request queue 305.

Bus controller 105 also includes an arbiter 307 and a multiplexer 309. Bus controller 105 further includes routing logic and miscellaneous buffering and registering logic (not shown). Each request queue sends its output (the oldest request) to arbiter 307. Arbiter 307 selects which request is "granted" during a given period of time from among the pending requests from each of the request queues 305. Over multiple periods of time, all requests are granted.

Multiplexer 309 receives the request selected by arbiter 307 and also an input of request attributes 310 and generates a single output 106, which includes the request attributes. This output 106 is sent to snoopers and targets. When a request is "granted", it is broadcasted to the snoopers and the targets via output 106.

During standard operation, when a request is granted, but then subsequently retried by the target or a snooper, the request remains on the "output" of FIFO 305. The request is later repeated when the arbiter 307 grants it again, without requiring any activity from the initiator on the request queue. The invention provides an additional set of operational characteristics/features in addition to the standard operation.

The invention determines when it is possible/desirable for the request queue to move on to the next request (the next oldest request) before the completion of the oldest request (i.e., in the event the oldest request is retried). This determination is completed by the initiator executing the application code and generating the request. The invention provides a performance advantage because the next request may go to a different slave that is not busy. For some initiators, such as bus-to-bus bridges, for example a set of forward progress dependencies is provided/included that requires the bridge to move on to write requests when a read request is retried in order to ensure forward progress. Thus, moving on to the next request before completion of a previously granted request may be necessary to avoid deadlocks.

According to the illustrative embodiment, the initiator and bus-controller interface includes a capability to allow the request FIFO to advance to the next request when the target retries the "oldest" request under control of the initiator and the bus controller. The invention provides this feature via the introduction and implementation of the following two signals:

(1) reorder-enable: issued from initiator to bus-controller; and (2) reorder-ack: issued from bus-controller to initiator.

In the illustrative embodiment, the reorder-enabled and reorder-ack are represented by signals (or wires) interconnecting the initiator and the request FIFO. These signals are asserted and de-asserted according to the features described below. In order the simplify the description of the invention, the terms reorder-enable signal and reorder-ack signal are respectively utilized to represent both the signal traveling on the respective wire and the wire itself.

The "reorder enable" signal is used to enable the initiator to instruct the bus-controller how to handle the request if the request is retried by the target. In one embodiment, the "reorder-enable" signal is asserted by the initiator with specific ones of the requests. In the illustrative embodiment, the signal is either asserted or de-asserted for each request by the initiator.

The initiator controls the assertion of "reorder-enable" based on its knowledge of the ordering requirements/dependencies among requests. For example, if the initiator has two requests to make and the two request must be completed in order, the initiator may de-assert "reorder-enable" with the first request. If "reorder-enable" is de-asserted with a given request and that request is retried by the target, the request remains on the output of the FIFO, and the FIFO logic does not attempt to move on to the next oldest request.

Another method requires that the initiator never queues the second request until the first request completes. This method, however, may prevent pipelining of sequential requests and slow down initiator generation and issuance of the requests to the FIFO particularly when the FIFO is empty.

The reorder-ack (acknowledge) signal (or signal wire) is asserted by the bus controller whenever a request is reordered relative to its original position in the request FIFO. Each reorder-ack signal is uniquely identified or affiliated with a particular request or reorder enable signal. The initiator is thus made aware that a particular request has not completed, and the initiator may then take necessary steps to maintain dependencies for subsequent requests etc.

Figures 4A, 5A, 5B:
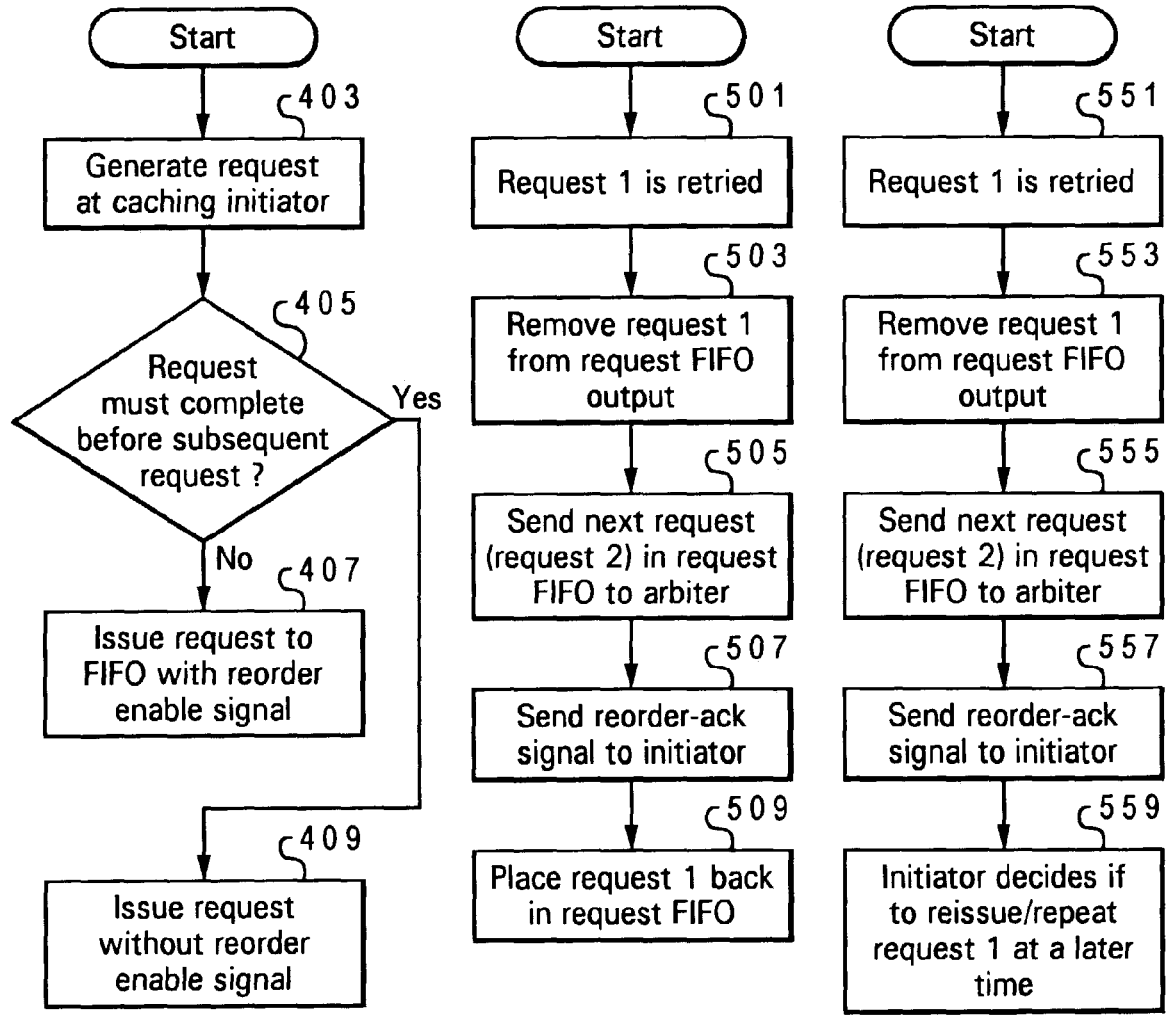
FIGS. 4A, 4B and 4B' are flow charts of the processes by which a reorder signal of a request is enabled and then utilized within request FIFO operations according to three embodiments of the present invention.
FIG. 5A is a flow chart of the process by which a request is reordered following a retry of that request according to one embodiment of the present invention.
FIG. 5B is a flow chart of the process by which a request is reordered following a retry of that request according to another embodiment of the present invention.

FIG. 4A illustrates the process by which the above signals are utilized to enable the features of the present invention. In this illustration, only those requests that may be reordered are issued with the reorder enabled signal asserted. The process begins when a request is generated at the initiator as shown at block 403. During generation a decision is made, as shown at block 405, whether the particular request must complete before subsequent requests are issued (i.e., whether the subsequent requests have processing dependency on the current request). If the request must complete before issuance of subsequent request from FIFO, the request is sent from initiator to FIFO without the reorder enable signal asserted as shown at block 407. However, if there is no dependency between the request and the subsequent request, the request is issued along with the reorder enabled signal asserted as indicated at block 409.

Figure 4B:
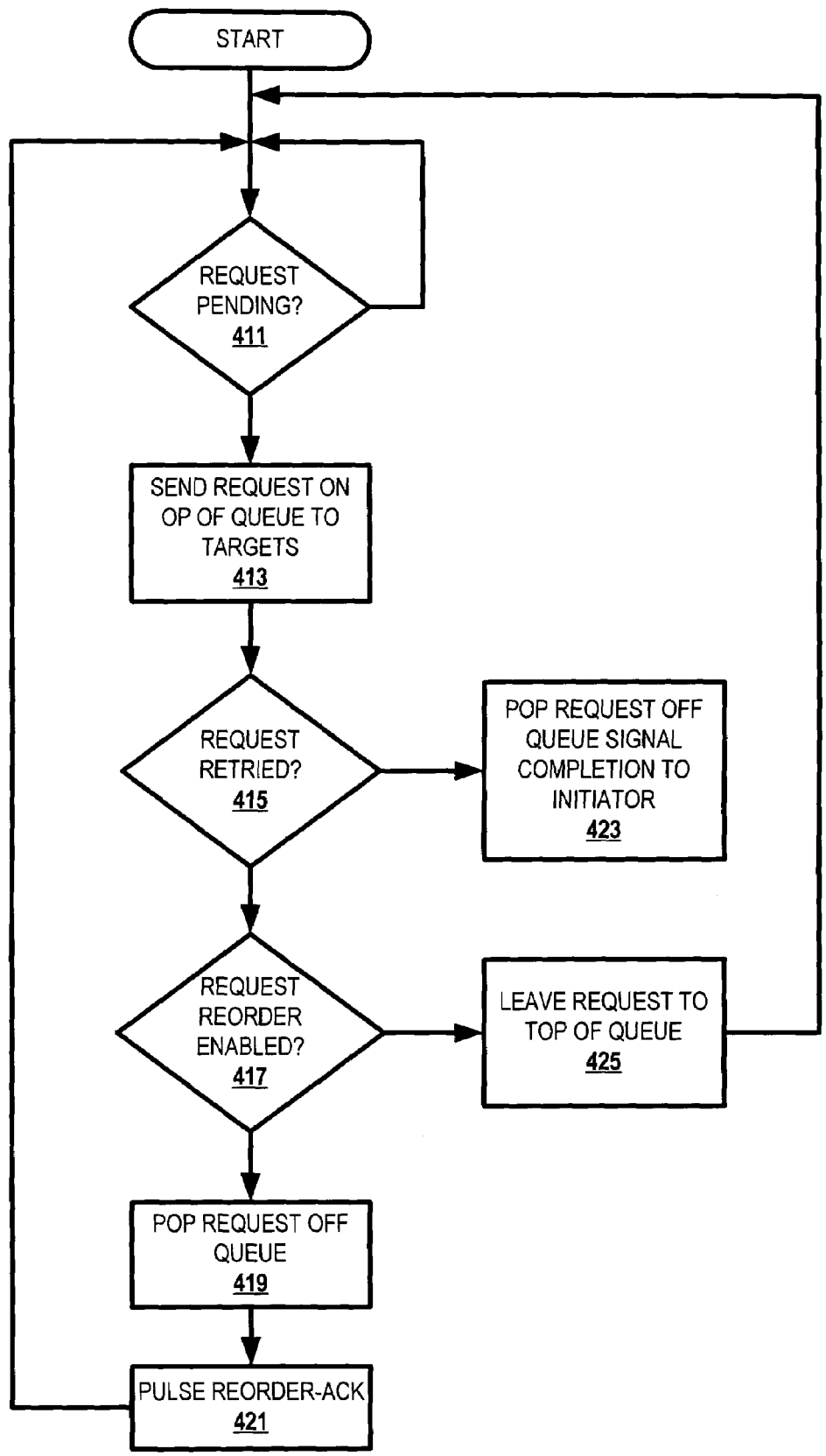
Figure 4B:
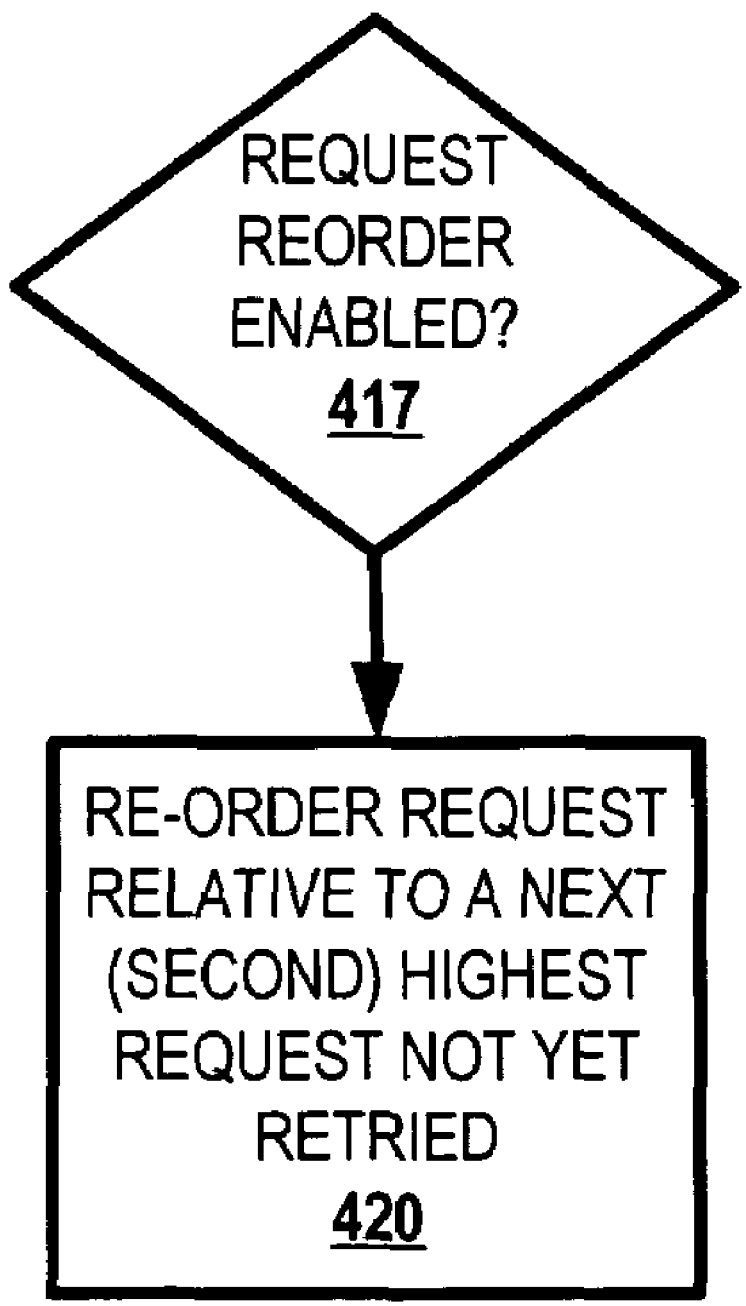

Turning now to FIG. 4B, there is illustrated the processing which occurs following the placing of the requests (with reorder enable signal) in FIFO. The process begins at block 411 with a determination by FIFO logic if a request is pending in FIFO. If there is at least one request pending, the request on top of the request FIFO is sent to the targets via the arbiter as shown at block 413. A determination is made at block 415 if the request is retried. If the request is not retried, the request is removed from the queue and the initiator signal of the completion of the request as shown at block 423.

If, however, the request is retried, a decision is made at block 417 whether request reorder signal is enabled. The FIFO logic checks the request reorder signal to see if it is enabled (e.g., if value of the reorder tracking bit is 1). If the request reorder feature of the request is not enabled, the request is left on the top of the queue as shown at block 425. If the request reorder feature is enabled, the request is "popped" of the FIFO as illustrated at block 419, and a reorder acknowledge signal is sent to the initiator as shown at block 421. The process is repeated for the next request in the queue. The routing logic directs the appropriate signals to/from the initiator associated with the granted request and the appropriate targets and snoopers.

Depending on implementation, the retried request is either moved to another location within the FIFO, enabling the request to be repeated after all other requests in the FIFO complete, or the retried request is removed from the FIFO entirely. When either implementation is utilized, the bus-controller is designed to only "reorder" a request when there is at least one other request pending in the request queue. Thus, no time or power is wasted when a request is retried but it is the only request that the initiator has pending.

In one implementation in which the retried request is moved within the request FIFO, the retried request is moved to the end of the request FIFO after all subsequent requests have each moved up one register in the request FIFO. In another implementation, illustrated by FIG. 4B', following the determination at block 417, the retried request is moved into the second register of the request FIFO (as shown at block 420). The second register is first vacated by next request that replaced the retried request at the top of the request FIFO. Accordingly, only one request actually passes the retried request. In another embodiment, which requires some additional logic for more complex processing, the retried request is placed at a queue slot/location determined by analyzing whether any other request within the queue has a dependency on the retried request. The retried request is then placed before that other request in the queue and the reorder enabled tag is removed.

FIGS. 5A and 5B illustrates two methods by which the re-order is completed once the re-order enabled signal is activated and a first request is retried. FIG. 5B starts at the point when a determination is made whether the request is retried as shown at block 501. When request1 has been retried, request1 is removed from the FIFO output as indicated at block 503. A next request, request2, is sent from FIFO to arbiter as shown at block 505. The reorder ack signal is sent to the initiator as shown at block 507. Then request1 is placed back in the FIFO as indicated at block 509.

The exact location in the FIFO at which request1 is placed may be a design specification which may be changed post-design in one embodiment. These changes may be via hardware (a flip switch on SoC to control reorder enabling) or software (logic with lists settable by applications running on SoC).

FIG. 5B provides a different embodiment by which re-order is completed. Several blocks are similar to FIG. 5A and will not be described herein. For the most part, the process steps are similar, with the exception of blocks 509 in FIGS. 5A and 558 and 559 in FIG. 5B. With FIG. 5B, the request1 is removed completely from the request FIFO as shown at block 558. The initiator then repeats request1 at a later time as shown at block 559. As indicated, unlike FIG. 5A, where request1 is re-ordered within the request FIFO, with the implementation of FIG. 5B request1 is completely removed from request FIFO and optionally sent back to the initiator to be reissued. Thus, when the retried request is completely removed from the request FIFO, the initiator may repeat/re-issue the request at a later time. Note, there may be cases when an initiator may choose not to repeat a request.

Figure 4C:
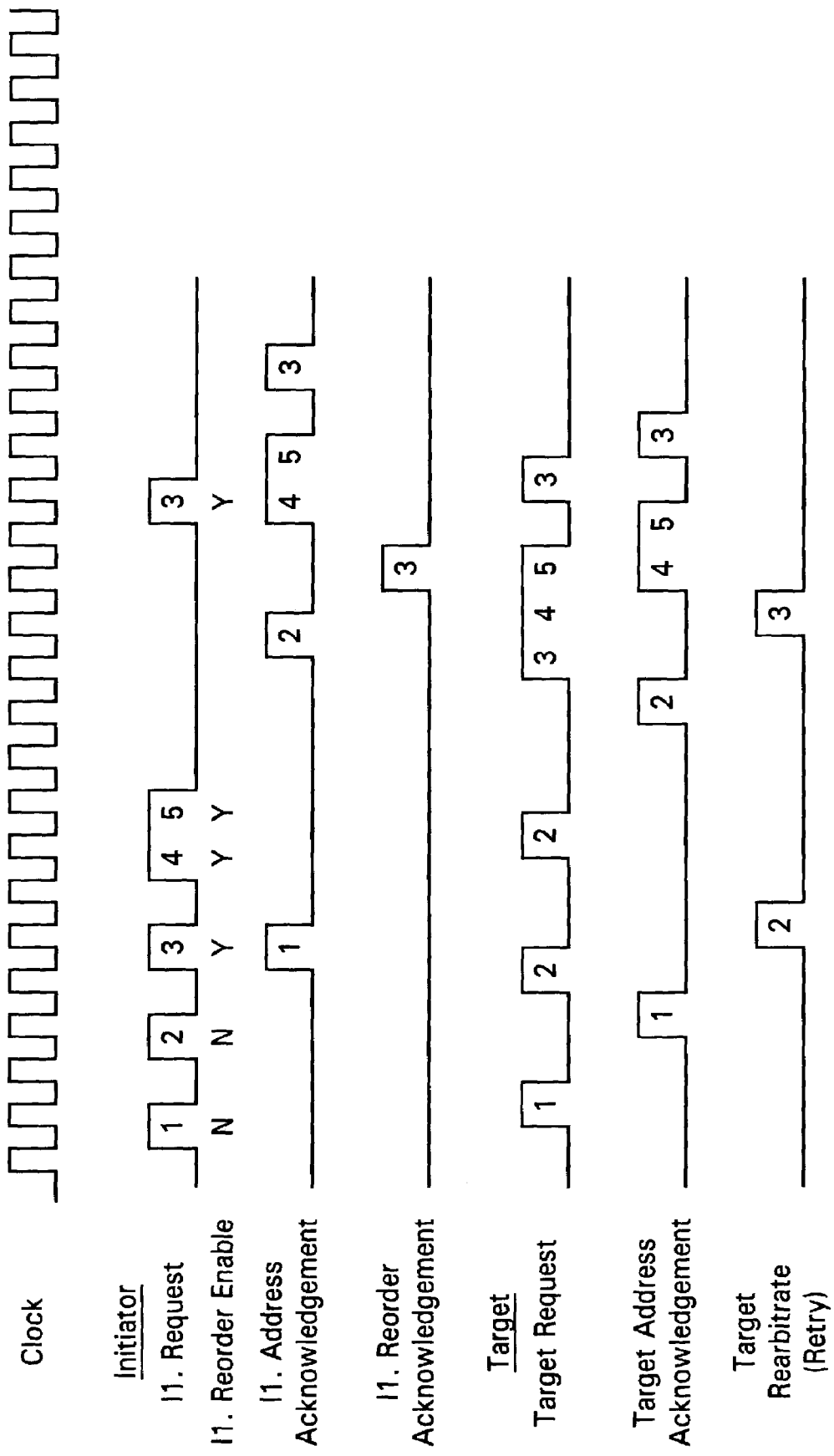
FIG. 4C is a timing diagram illustrating the clock cycles for a process of accepting and retrying a request.

FIG. 4C is a timing diagram illustrating the waveforms of a subset of the signals on the PLB5 bus during the processing steps similar to those of FIG. 4A and FIG. 5B. In particular, FIG. 4C shows some of the control signals associated with the request/address tenures. With this illustration, "req" is request and "addrAck" is address acknowledge, which indicates completion of a request. Also, retried requests are sent back to the initiator to be re-issued later. The sequential clock cycles are shown at the top of the illustration.

As shown, initiator makes a series of five requests in cycles 1, 3, 5, 7 and 8. The first two requests are not reorder-enabled, and the next three requests are reorder-enabled. The bus controller forwards request1 to the target on cycle 2. The target completes request1 on cycle 4 and request1 competes at the initiator in cycle 5. The bus controller forwards request2 to the target in cycle 5 and the target retries request2 in cycle 6. Because request2 is not reorder-enabled, the bus controller repeats request2 in cycle 8. The target completes request2 in cycle 10.

The bus controller forwards request3 to the target in cycle 1 . The bus controller also forwards request4 to the target in cycle 12 and request5 in cycle 13. The bus controller pipelines these requests because the bus controller does not need to wait to see how the target is going to respond to request3 before proceeding. This is because these request are re-ordered enabled. As shown, the target retries request3 in cycle 12. The bus controller asserts I1_reorderAck to the initiator (I1) in cycle 13 to inform the initiator that request3 has been "reordered". The target completes request4 and request5 in cycles 13 and 14, and they are signaled as complete to the initiator in cycles 14 and 15.

The initiator repeats request3 in cycle 14, and request3 is again forwarded to the target in cycle 15. The target completes request3 in cycle 16, and the completion is signaled to the initiator in cycle 17.

On method of implementing the enabling/disabling of a reorder enable signal is to provide within that signal a single bit (reorder tracking bit), which may be dynamically set by the initiator to "1" when the reorder enabled signal is to be enabled. The bit is otherwise "0". The FIFO logic reads the value of this bit to determine when to force the reordering of a retried request. In one embodiment, FIFO is designed with space for an additional bit in each register location/slot. This bit holds the value of the reorder enable signal for the corresponding request stored at that FIFO slot.

One design feature for SoC given the various embodiments described herein is the inclusion of an on-chip flip switch or select mechanism by which a customer or chip designer may manually select between hardware-directed FIFO request reordering and the various software-directed methods. With this design, the flip switch may provide a single on/off bit for the selection between hardware and software. Alternatively, the select mechanism may be utilized to identify which software method to implement or whether to allow an application to override/initiator logic when assigning reorder enable status to each request.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A system on a chip (SoC) comprising:
an initiator;
a target device;
a bus controller;
coupling means for connecting said initiator and said target device to said bus controller;
wherein said bus controller includes a request FIFO that orders requests generated by said initiator and grants requests for transmission to said target device;
wherein said initiator includes logic for:
determining which requests do not have downstream dependency for subsequent requests;
tagging those requests with no downstream dependencies to indicate to logic of said request FIFO tat a subsequent request may be granted when a prior request is retried, wherein a request that is not tagged must be completed prior to issuing said next sequential request; and
wherein said bus controller further includes controller logic for:
tracking a first request granted from said request FIFO to determine whether said first request is completed or retried by said target; and
removing said first request from a first position of said request FIFO when said first request is retried by said target; and
granting a next sequential request from said FIFO following said removing step, whereby said next request is granted prior to a completion of the first request.

2. The SoC of claim 1, wherein said controller logic completes said tracking operation by:
monitoring a response path from said target for a response to said first request; and
initiating said removing of said first request from said first position of FIFO when said response is a retry.

3. The SoC of claim 1, wherein said tagging of said requests include:
generating a reorder enable signal that operates as said tag associated with a particular request; end
issuing said request along with said reorder enable signal, wherein said controller logic receives said reorder enable signal and modifies a response for a corresponding request when that corresponding request receives a retry response from its intended target, wherein said controller logic only removes a request that is identified to receive a modified response when a retry response is received from a target.

4. The SoC of claim 1, wherein said logic includes logic for:
recognizing which request are tagged; and
initiating said removing and said granting operations only when said first request is tagged.

5. The SoC of claim 1, wherein said controller logic further includes logic for reordering said first request within said request FIFO when said first request is retried.

6. The SoC of claim 2, wherein said controller logic further includes means for messaging said initiator wit that said first request has been retried and subsequently removed from the first position of said request FIFO.

7. The SoC of claim 5, wherein said logic for reordering places said first request in a second highest position of said request FIFO.

8. The SoC of claim 5, wherein said logic for reordering includes logic for:
determining whether any other request within said request FIFO has a dependency on said first request;
when said first request has no dependencies within said request FIFO placing said first request at any location within said request FIFO; and
when said first request has a dependency within said request FIFO, placing said first request in a position of said request FIFO ahead of any other request in said request FIFO which has a dependency on said first request.

9. The SoC of claim 6, wherein said initiator comprises logic for:
receiving said message from said controller logic; and
responding to a receipt of said message in one of two ways from among re-ordering said first request for issuing to said request FIFO and preventing said first request from future issue.

10. The SoC of claim 8, wherein said logic for reordering includes logic for removing a reorder tag when said first request is placed in a location of said request FIFO ahead of another request which has a dependency on said first request.

11. A method for reordering requests within a request FIFO of a bus controller, said method comprising:
monitoring a response path for a response from a target to which a first request of said request FIFO has been sent;
granting a next sequential request with the request FIFO when said response is a retry response; and
reordering said first request within said request FIFO, wherein said reordering includes;
determining whether any other request within said request FIFO has a dependency on said first request;
when said first request has no dependencies within said request FIFO, placing said first request at any location within said request FIFO; and
when said first request has a dependency within said request FIFO, placing said first request in a position of said request FIFO ahead of any other request in said request FIFO which has a dependency on said first request.

12. The method of claim 11, further comprising:
removing said first request from a first register of said request FIFO, wherein said first register holds the request that is granted by said request FIFO for completion and said request FIFO automatically moves the next sequential request from a second register into said first register when a retry response is received for the first request.

13. The method of claim 11, wherein said logic for reordering placing said first request in a second highest position of said request FIFO.

14. The method of claim 11, further comprising:
messaging an initiator that generated said first request that said first request has been retried.

15. The method of claim 11, further comprising:
messaging an initiator that generated said first request that said first request has been retried and reordered with the request FIFO.

16. The method of claim 11, wherein said monitoring and granting steps are completed by logic components of a bus controller and said bus controller operates within a system-on-a-chip (SoC) to interconnect devices of said SoC, including an initiator and a target.

17. The method of claim 12, further comprising:

messaging an initiator that generated said first request that said first request has been retried and removed from said request FIFO.

18. A method for reordering requests within a request FIFO of a bus controller, said method comprising:

monitoring a response path for a response from a target to which a first request of said request FIFO has been sent;

generating said first request with an associated tag indicating that said first request may be reordered with respect to said next sequential request;

granting a next sequential request with the request FIFO when said response is a retry response; and completing said granting of a next sequential request only when said first request has said associated tag;

wherein when said first request does not have said associated tag said next sequential request is granted only when said response is a completion response, which indicates that said first request has completed at said target.

19. The method of claim 18, wherein said generating step includes:

determining whether subsequent requests are dependent on a completion of said first request; and associating said tag with said first request only when said subsequent requests are not dependent on a completion of said first request.

20. The method of claim 18, wherein said reordering step includes:

determining whether another request within the request FIFO is dependent on a completion of said first request;

when said first request has no dependencies within said request FIFO;

placing said first request at any location within said request FIFO; and when said first request has a dependency within said request FIFO, placing said first request in a position of said request FIFO ahead of any other request in said request FIFO which has a dependency on said first request.

21. The method of claim 20, wherein said placing step includes removing a reorder tag of said first request when said first request is placed in a location of said request FIFO ahead of another request which has a dependency on said first request.

* * * * *

UNITED STATES PATENT AND TRADEMARK OFFICE
CERTIFICATE OF CORRECTION

| | | |
|---|---|---|
| PATENT NO. | : 7,035,958 B2 | Page 1 of 1 |
| APPLICATION NO. | : 10/264170 | |
| DATED | : April 25, 2006 | |
| INVENTOR(S) | : Victor R. Augsburg et al. | |

It is certified that error appears in the above-identified patent and that said Letters Patent is hereby corrected as shown below:

In Claim 1, at column 9, line 17, delete "tat" and insert --that--.

In Claim 3, at column 9, line 43, delete "end" and insert --and--.

In Claim 6, at column 9, line 61, delete "wit" and insert --with--.

Signed and Sealed this

Twelfth Day of December, 2006

JON W. DUDAS
*Director of the United States Patent and Trademark Office*